United States Patent [19]

Gill

[11] Patent Number: 4,772,152

[45] Date of Patent: Sep. 20, 1988

[54] CONNECTOR FOR CONVEYING FLUID

[75] Inventor: David C. Gill, Keynsham, England

[73] Assignee: Nomix Manufacturing Co. Limited, Bristol, United Kingdom

[21] Appl. No.: 891,394

[22] Filed: Jul. 29, 1986

[30] Foreign Application Priority Data

Aug. 6, 1985 [GB] United Kingdom ............... 8519734

[51] Int. Cl.[4] .......................... F16B 2/04; F16L 37/26
[52] U.S. Cl. ..................... 403/289; 403/326;
285/331; 411/509; 220/277; 220/375
[58] Field of Search ............... 220/375, 277, 278, 306,
220/284; 222/545, 541; 285/3, 4, 331, 423;
403/326, 335, 375, 289, 18, 406, 1; 24/453, 297;
411/512, 508-510

[56] References Cited

U.S. PATENT DOCUMENTS

| 3,204,836 | 9/1965 | Joffe ................................. 222/545 |
| 3,588,149 | 6/1971 | Demler, Sr. .................... 285/331 X |
| 4,061,250 | 12/1977 | Tada . |
| 4,227,594 | 10/1980 | Kluger ........................ 403/406.1 X |
| 4,256,333 | 3/1981 | Jones ............................. 285/331 X |
| 4,401,326 | 8/1983 | Blair . |
| 4,484,907 | 11/1984 | Sheeran, Jr. .................. 220/284 X |
| 4,487,437 | 12/1984 | Dickirson . |
| 4,534,088 | 8/1985 | Ricke ............................... 24/297 X |
| 4,624,585 | 11/1986 | Nix et al. ....................... 411/509 X |

FOREIGN PATENT DOCUMENTS

| 2127651 | 2/1975 | Fed. Rep. of Germany . |
| 285699 | 2/1965 | Netherlands ...................... 220/278 |
| 285699 | 2/1965 | Netherlands ...................... 220/278 |
| 285699 | 2/1965 | Netherlands ...................... 220/278 |
| 285699 | 2/1965 | Netherlands ...................... 220/278 |
| 285699 | 2/1965 | Netherlands ...................... 220/278 |
| 285699 | 2/1965 | Netherlands ...................... 220/278 |
| 285699 | 2/1965 | Netherlands ...................... 220/278 |
| 583398 | 12/1976 | Switzerland . |
| 1340432 | 12/1973 | United Kingdom . |
| 2091365 | 7/1982 | United Kingdom . |
| 2045883 | 6/1983 | United Kingdom . |
| 2136321 | 9/1984 | United Kingdom . |
| 2091367 | 2/1985 | United Kingdom . |
| 2160279 | 12/1985 | United Kingdom . |

OTHER PUBLICATIONS

FIP 8308, Jan. 1969, Gach.

Primary Examiner—Randolph A. Reese
Assistant Examiner—Peter M. Cuomo
Attorney, Agent, or Firm—Merchant, Gould, Smith, Edell, Welter & Schmidt

[57] ABSTRACT

A releasable connector comprises first and second elements (A,B). The elements (A,B) have flanges (10,34) which lie face-to-face when the elements are interconnected. The flange (10) of the first element (A) has flexible lugs (12) which carry barbs (14). The barbs (14) engage the flange (34) of the second element (B) to retain the elements together. The first element (A) has a socket (2) within which extends a nozzle (4). The second element (B) comprises a plug which fits in the socket (2) and which has a bore (38) fitting over the nozzle (4).

6 Claims, 2 Drawing Sheets

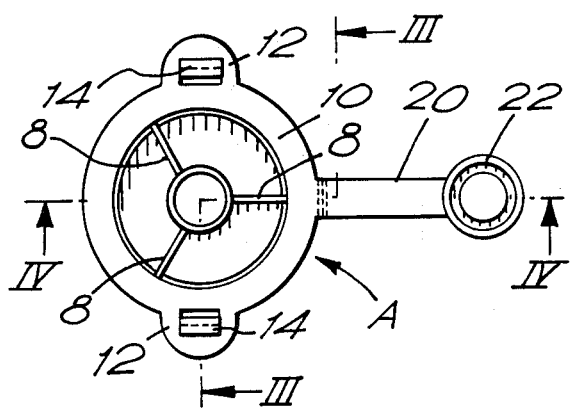
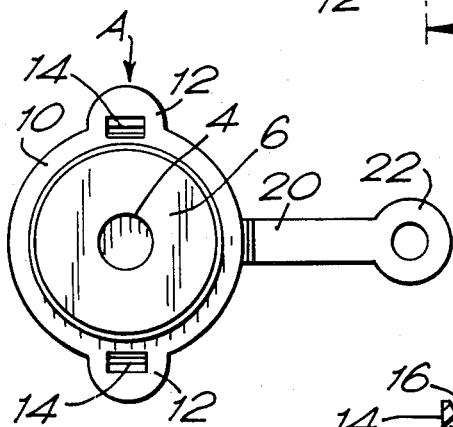
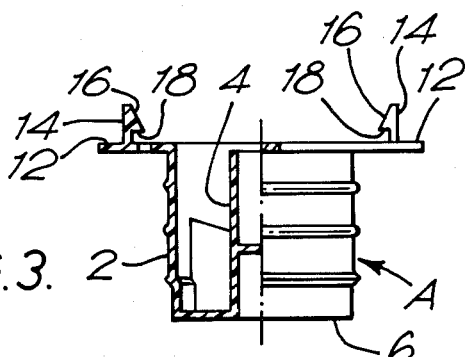
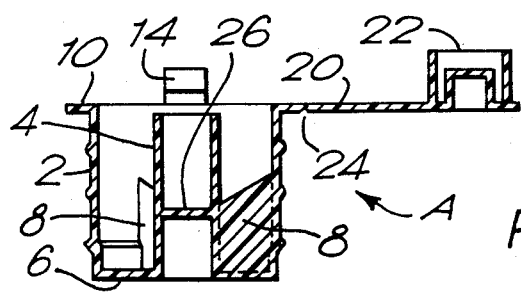

CONNECTOR FOR CONVEYING FLUID

This invention relates to a releasable connector for conveying fluids.

In my patent specification GB No. 2136321, a connector is disclosed which comprises two inter-fitting elements which can be retained together by means of a C-shaped clip engaging flanges on the respective elements. A disadvantage of this connector is that three separate components must be manufactured, one of which (the C-shaped clip) is easily mislaid.

Broadly stated, the present invention comprises a releasable connector for conveying fluids, comprising first and second elements which are interconnectable to provide a flow path through the connector, the elements being provided with integral latching means for retaining the elements together.

More specifically, the present invention provides a releasable connector for conveying fluids, comprising first and second elements which are interconnectable to provide a flow path through the connector, the first element having an outer tubular portion comprising a socket and an inner tubular portion comprising a nozzle, the second element comprising a body for sealing engagement with the socket, the body having an opening which receives the nozzle when the body is inserted into the socket, the first and second elements each having respective parts of a latching device which is operative to retain the body within the socket.

One part of the latching device may comprise a barb; preferably, it comprises two barbs which are situated diametrically opposite each other. The other part of the latching device may be a flange which is engageable by the barb or barbs.

Each barb may be mounted on a lug which projects radially outwardly from the element on which it is mounted. By making the elements from flexible material, such as high density polyethylene, the barb or barbs can be released from the other part of the latching device (such as the flange) by resiliently deflecting the lug. The barb may have a cam surface inclined to the longitudinal axis of the connector so that the latching device will automatically engage as the two elements of the connector are brought together.

The first element may have an integral cap, connected to the rest of the elements by a flexible strap, for closing the nozzle when the second element is removed. Furthermore, the nozzle may initially have a partition along its length which must be broken before the connector is first used to convey fluid. The second element may be equipped with a sharp-edged projection for piercing the partition when the elements are first interconnected. The rigidity of the first element may be improved by providing webs which extend radially between the outer surface of the nozzle and the inner surface of the socket.

The two elements may conveniently be formed as integral mouldings.

A preferred use of the connector is to provide a releasable connection between a container of herbicide and spraying equipment for distributing the herbicide. In such use, the first element would be connected to the connector, and the second element would be connected to the spraying equipment. The container may, for example, comprise a flexible bag made from plastics material, which can be welded to the outer surface of the socket.

For a better understanding of the present invention, and to show how it may be carried into effect, reference will now be made, by way of example only, to the accompanying drawings, in which:

FIG. 1 is one end view of a first element of a connector;

FIG. 2 is a view of the other end of the first element;

FIG. 3 is a sectional view taken on the line III—III in FIG. 1;

FIG. 4 is a sectional view taken on the line IV—IV in FIG. 1;

Figure 5:
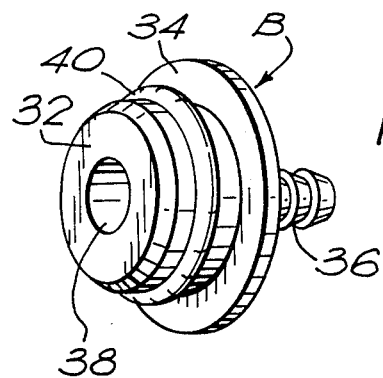
FIG. 5 is a perspective view of a second element of the connector.

The first element of the connector, as shown in FIGS. 1 to 4, comprises an outer tubular portion comprising a socket 2, and an inner tubular portion comprising a nozzle 4. The socket 2 and nozzle 4 are connected together at one end of the element by an end wall 6. Three equally distributed webs 8 interconnect the outer surface of the nozzle 4 and the inner surface of the socket 2 in order to make the structure of the first element more rigid.

At the end of the socket 2 away from the end wall 6, the socket 2 is provided with a radially outwardly extending flange 10, which has two diametrically oppositely disposed lugs 12. Each lug carries a barb 14. Each barb 14 has a cam face 16 which is inclined to the longitudinal axis of the first element, and a latching face 18 which extends parallel to, and a short distance from, the flange 10.

The flange 10 also carries a flexible strap 20 which is provided with a cap 22 at its outer end. The strap 20 has a local reduction in thickness at 24 in order to permit easy bending of the strap 20 to allow the cap 22 to fit over the end of the nozzle 4. The nozzle 4 also has an internal partition 26 which must be ruptured before the connector is first used.

The second element of the connector, shown in FIG. 5, comprises a body 32 having at one end a flange 34 from which projects a spigot 36. The body 32 has an opening 38 which communicates with the interior of the spigot 36. A seal 40 is received in a groove in the outer surface of the body 32.

An intended use of the connector shown in the drawings is to provide a releasable connection between spraying equipment and a container of herbicides to be sprayed. In a preferred embodiment, the container comprises a flexible bag of plastics material which is welded to the outer surface of the socket 2 so that the interior of the bag communicates with the interior of the nozzle 4. The second element B is connected to the spraying equipment by inserting the spigot 36 into a flexible tube which extends to delivery means of the spraying equipment. Suitable spraying equipment is, for example, shown in my patent specification GB No. 2136321.

For use, the partition 26 in the nozzle 4 is ruptured, and the body 32 of the second element B is inserted into the socket 2 of the first element A. This causes the nozzle 4 to enter the opening 38, so that the container of herbicide is put into communication with the tube fitted over the spigot 36. As the body 32 is inserted, the flange 34 of the second element B approaches the flange 10 of the first element A, and eventually engages the surfaces 16 of the barbs 14. A camming action is applied to the barbs 14, causing them to deflect away from each other, as indicated by the arrows X, until the flanges 34 and 10 lie adjacent one another. The barbs 14 then spring back over the flange 34, so that the flange 34 is engaged by the latching face 18, which prevents removal of the second element B from the first element A.

To release the connector, the lugs 12 can be engaged by the fingers and pulled back in the direction indicated by the arrows X, so moving the barbs 14 apart from each other until the latching face 18 has moved out of engagement with the flange 34. The element B can then be removed from the element A.

The cap 22 can then be fitted over the nozzle 4, to prevent leakage from the container to which the element A is fitted.

Figure 7:
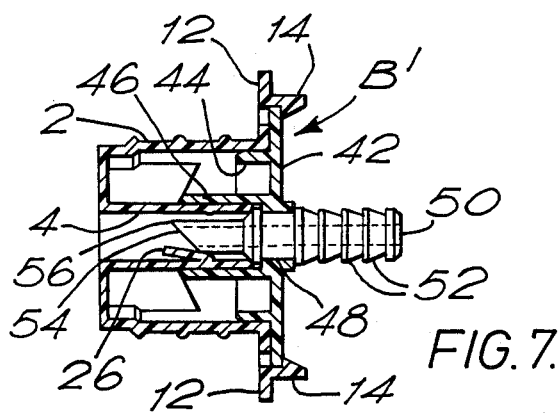
FIG. 7 shows a connector having an alternative form of second element.

In an alternative embodiment shown in FIG. 7, the first element A of the connector is the same as that shown in FIGS. 1 to 4, but the second element B' is different. It comprises a disc 42 from which two circular skirts 44 and 46 project. The outer skirt 44 is shorter than the inner skirt 46. The outer skirt 44 is a close fit within the socket 2, and the inner skirt 46 is a close fit over the nozzle.

The disc 42 has a central aperture 48 within which a brass connector 50 is fitted. On the side opposite the skirts 44 and 46, the connector 50 has fir-tree formations 52 for insertion into a tube extending to delivery means of the spraying equipment. On the other side of the disc 42, the connector has an oblique end 54 which gives the connector a sharply pointed leading edge 56.

It will be appreciated that, the first time the element B' is inserted into the socket 2, the leading edge 56 will cut the partition 26 and tilt it to the position shown in FIG. 7. The partition 26 will remain attached to the nozzle 4, and so there is no danger of it coming free and moving about in the container, where it could cause blockages.

The inner skirt 46 makes sealing engagement with the nozzle 4, while the outer skirt 44 provides secondary sealing against the socket 2. Thus there is little danger of herbicide leakage. Furthermore, the inner skirt 46 extends beyond the leading edge 56 of the connector 50 and so acts as a shroud, preventing injury from the sharp edge of the connector.

Figure 6:
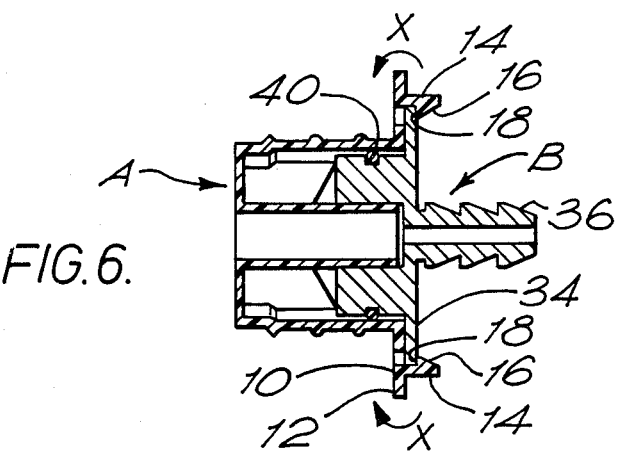
FIG. 6 shows the two elements of the connector in engagement which each other.

As in the embodiment of FIGS. 5 and 6, the element B' is retained in position on the element A by the barbs 14. The element B' is released by deflecting the lugs 12 as described above. When the element B' is removed, the areas contaminated with herbicides are protected from unintentional contact by the inner skirt 46.

I claim:
1. A releasable connector for conveying fluids, comprising:
   first and second elements which are interconnectable to provide a flow path through the connector;
   a generally planar flange formed integrally on the first element;
   a latching element formed integrally on the flange of the first element, the latching element being resiliently displaceable between a latching position and a release position; and
   a generally planar flange formed integrally on the second element, and having a peripheral edge, the flange on the second element being positioned for face-to-face contact with the flange on the first element when the elements are interconnected, and being sized for engagement of its peripheral edge by the latching element to retain the first and second elements together, said latching element having a fully exposed barb formed on a projecting portion of the flange in which the portion extends beyond the peripheral edge of the flange of the second element when said first and second elements are engaged, said projecting portion comprises a flexible release lug, said barb being capable of manual retraction for release by a user.

2. A releasable connector as claimed in claim 1, in which the first element has an outer tubular portion comprising a socket and an inner tubular portion comprising a nozzle, and in which the second element comprises a body for sealing engagement with the socket, the body having an opening which receives the nozzle when the body is inserted into the socket.

3. A releasable connector as claimed in claim 2, in which the nozzle is provided with a breakable partition, the second element having a tubular element with a sharpened leading edge which enters the nozzle, when the elements are interconnected, thereby to rupture the partition to permit flow through the connector.

4. A releasable connector as claimed in claim 2, in which the tubular element is secured within an opening in the second element.

5. A releasable connector as claimed in claim 2, in which the second element comprises an outer skirt for sealing engagement with the socket, and an inner skirt for sealing engagement with the nozzle.

6. A releasable connector as claimed in claim 1, in which the latching element comprises one of two diametrically oppositely disposed latching elements.

* * * * *